US008020155B2

(12) United States Patent
Lu et al.

(10) Patent No.: US 8,020,155 B2
(45) Date of Patent: Sep. 13, 2011

(54) MECHANISM FOR OPTIMIZING FUNCTION EXECUTION

(75) Inventors: Jiwei Lu, Pleasanton, CA (US); William Yu-Wei Chen, Sunnyvale, CA (US)

(73) Assignee: Oracle America, Inc., Redwood City, CA (US)

(*) Notice: Subject to any disclaimer, the term of this patent is extended or adjusted under 35 U.S.C. 154(b) by 1106 days.

(21) Appl. No.: 11/605,540

(22) Filed: Nov. 28, 2006

(65) Prior Publication Data

US 2008/0127071 A1 May 29, 2008

(51) Int. Cl.
*G06F 9/45* (2006.01)
(52) U.S. Cl. ............... 717/153; 717/159; 717/162
(58) Field of Classification Search ............ None
See application file for complete search history.

(56) References Cited

U.S. PATENT DOCUMENTS

| 6,330,714 | B1* | 12/2001 | Hicks et al. | 717/131 |
|---|---|---|---|---|
| 6,591,416 | B1* | 7/2003 | Bak et al. | 717/159 |
| 6,658,654 | B1* | 12/2003 | Berry et al. | 717/131 |
| 6,685,567 | B2* | 2/2004 | Cockerille et al. | 463/43 |
| 6,954,846 | B2* | 10/2005 | Leibholz et al. | 712/43 |
| 6,971,091 | B1* | 11/2005 | Arnold et al. | 717/145 |
| 6,978,466 | B2* | 12/2005 | Kerly | 719/332 |
| 7,146,607 | B2* | 12/2006 | Nair et al. | 717/151 |
| 7,155,600 | B2* | 12/2006 | Burky et al. | 712/229 |
| 7,353,507 | B2* | 4/2008 | Gazdik et al. | 717/159 |
| 7,395,530 | B2* | 7/2008 | Inglis et al. | 717/153 |
| 7,496,915 | B2* | 2/2009 | Armstrong et al. | 718/100 |
| 7,519,951 | B2* | 4/2009 | Deedwaniya et al. | 717/122 |
| 7,703,081 | B1* | 4/2010 | Buches | 717/127 |
| 7,735,138 | B2* | 6/2010 | Zhao | 726/24 |
| 2004/0221272 | A1* | 11/2004 | Wu et al. | 717/128 |

OTHER PUBLICATIONS

Marmot: an optimizing compiler for Java; Robert Fitzgerald, et al., Software-Practice and Experience; 2000; 30:199-232.*
CATCH—A Call-Graph Based Automatic Tool for Capture of Hardware Performance Metrics for MPI and Open MP Applicaitons, DeRose et al., Euro-Par 2002 Parallel Processing, Lecture Notes in Computer Science, 2002, vol. 2400/2002, 167-176.*
Jiwei Liu, et al., "Dynamic Helper Threaded Prefetching on the Sun UltraSPARC CMP Processor", 2005, Proceedings of the 38th Annual IEEE/ACM International Symposium on Microarchitecture, pp. 1-12.*

(Continued)

*Primary Examiner* — Tuan Dam
*Assistant Examiner* — Xi D Chen
(74) *Attorney, Agent, or Firm* — Osha • Liang LLP (57) ABSTRACT

A mechanism is provided for managing the referencing of at least two versions of a function. A first version is a single threaded version that does not ensure multi-thread safety. A second version is a multi threaded version that does ensure multi-thread safety. The mechanism determines whether a set of executable code (e.g. a program) is currently executing in single-threaded mode or multi-threaded mode. If the executable code is executing in single-threaded mode, then the mechanism causes the executable code to reference the first version of the function. If the executable code is executing in multi-threaded mode, then the mechanism causes the executable code to reference the second version of the function. By doing so, the mechanism ensures that the additional overhead of ensuring multi-thread safety is incurred only when it is needed. In this manner, the mechanism makes execution of the function more optimal.

6 Claims, 7 Drawing Sheets

OTHER PUBLICATIONS

Abhinav Das, et al., "Region Monitoring for Local Phase Detection in Dynamic Optimization System", Mar. 2006, Proceeding of the International Symposium on Code Generation and Optimization, pp. 1-12.*

Powell, et al., "SunOS Multi-thread Architecture", USENIX, Winter 1991. [retrieved on Jun. 23, 2011]; Retrieved from Internet <URL:http://citeseerx.ist.psu.edu/viewdoc/download?doi=10.1.1.98.8218&rep=rep1&type=pdf>;pp. 1-14.*

ACM Portal entitled, "The Guide to Computing Literature, Mostly Lock-Free Malloc", authored by Dave Dice & Alex Garthwaite, published by ACM Press, New York, NY (5 pgs)—http://portal.acm.org/citation.cfm?id=512451.

* cited by examiner

MECHANISM FOR OPTIMIZING FUNCTION EXECUTION

BACKGROUND

Many operating systems provide basic functions that can be invoked by programs to perform basic, low level tasks. For example, the function "malloc" can be invoked to cause memory to be dynamically allocated. These functions can be invoked many times during program execution; thus, it is important that these functions execute as efficiently as possible. Otherwise, overall program performance may suffer.

The functions provided by the operating system may be invoked by different programs in different execution contexts. For example, a function may be invoked by a program when that program is executing in single threaded mode. Similarly, a function may be invoked by a program when that program is executing in multi threaded mode. Because a function may be invoked by programs in both single and multi threaded modes, it has to accommodate both modes. This usually means that the function has to execute additional code to ensure that it is multi thread safe. Malloc, for example, implements locking code to derive locking functionality. This locking functionality ensures that multiple threads will not be allowed to write to the same memory region at the same time. This helps to ensure that data integrity and consistency are not compromised when a program is executing in multi threaded mode.

The problem with executing additional code to ensure multi thread safety is that it imposes additional overhead on the functions. This additional overhead is often incurred needlessly. For example, when a function is invoked by a program executing in single threaded mode, it does not need to ensure multi thread safety. Nevertheless, the additional code is executed anyway. This needless incurrence of the additional overhead causes the operation of the functions to not be optimized. Because these functions are invoked many times by many different programs, this non-optimized behavior can lead to significant program performance degradation.

SUMMARY

To overcome the shortcomings of the prior art, one embodiment of the present invention provides a mechanism for managing the referencing of at least two versions of a function. A first version is a single threaded version that does not have any code for ensuring multi thread safety. A second version is a multi threaded version that does have code for ensuring multi thread safety. The mechanism determines whether a set of executable code (e.g. a program) is currently executing in single threaded mode (i.e. a mode in which there is only one thread of execution that may potentially invoke the function) or in multi threaded mode (i.e. a mode in which there are multiple threads of execution that may potentially invoke the function). If the executable code is executing in single threaded mode, then the mechanism causes the executable code to reference the first version of the function. If the executable code is executing in multi threaded mode, then the mechanism causes the executable code to reference the second version of the function. By doing so, the mechanism ensures that the additional overhead of ensuring multi thread safety is incurred only when it is necessary. In this manner, the mechanism makes execution of the function more optimal.

In one embodiment, the mechanism operates as follows. Initially, when a set of executable code starts executing, the mechanism causes the executable code to reference the first version of the function. At this point, the executable code has only one thread of execution that may potentially invoke the function; thus, it is safe for the executable code to reference the version of the function that does not ensure multi thread safety. At some point during execution, the mechanism may detect that another thread of execution has been or will be created for executing the executable code such that the executable code has or will have multiple threads of execution that may potentially invoke the function. In response to such detection, the mechanism causes the executable code to reference the second version of the function instead of the first version. In one embodiment, this may be done by rewriting a portion of the executable code to cause that portion to point to the second version instead of the first version. By doing so, the mechanism ensures that when the executable code is executing in multi threaded mode, it references the version of the function that ensures multi thread safety.

As a further enhancement, the mechanism may also detect at some point that the executable code no longer has multiple threads of execution that may potentially invoke the function, and hence, is no longer executing in multi threaded mode. In response to such detection, the mechanism causes the executable code to reference the first version again instead of the second version. In one embodiment, this may be done by rewriting the same portion of the executable code as that mentioned above to cause that portion to point to the first version instead of the second version. In this manner, the mechanism causes the first version to be referenced whenever possible and the second version to be referenced only when necessary. By doing so, the mechanism enables execution of the function to be more optimal.

DETAILED DESCRIPTION OF EMBODIMENT(S)

Overview

In accordance with one embodiment of the present invention, there is provided a run time optimizer (RTO) for enabling programs (also referred to herein as sets of executable code) to run more optimally on a computing platform. In one embodiment, the RTO, in cooperation with an operating system, manages the referencing of multiple versions of a function. A first version of the function is a single threaded version that does not have any code for ensuring multi thread safety. A second version of the function is a multi threaded version that does have code for ensuring multi thread safety. If a program is executing in single threaded mode (i.e. a mode in which there is only one thread of execution that may potentially invoke the function), then the program is caused to reference the first version of the function. If the program is executing in multi threaded mode (i.e. a mode in which there are multiple threads of execution that may potentially invoke the function), then the program is caused to reference the second version of the function. By doing so, the RTO ensures that the additional overhead of ensuring multi thread safety is incurred only when it is necessary; thus, execution of the function is made more optimal. In one embodiment, the RTO is implemented as a dynamic link library (DLL) that is linked with a program when that program is loaded and executed. However, it should be noted that the RTO may be implemented in other forms as well. All possible implementations are within the scope of the present invention.

Figure 1:
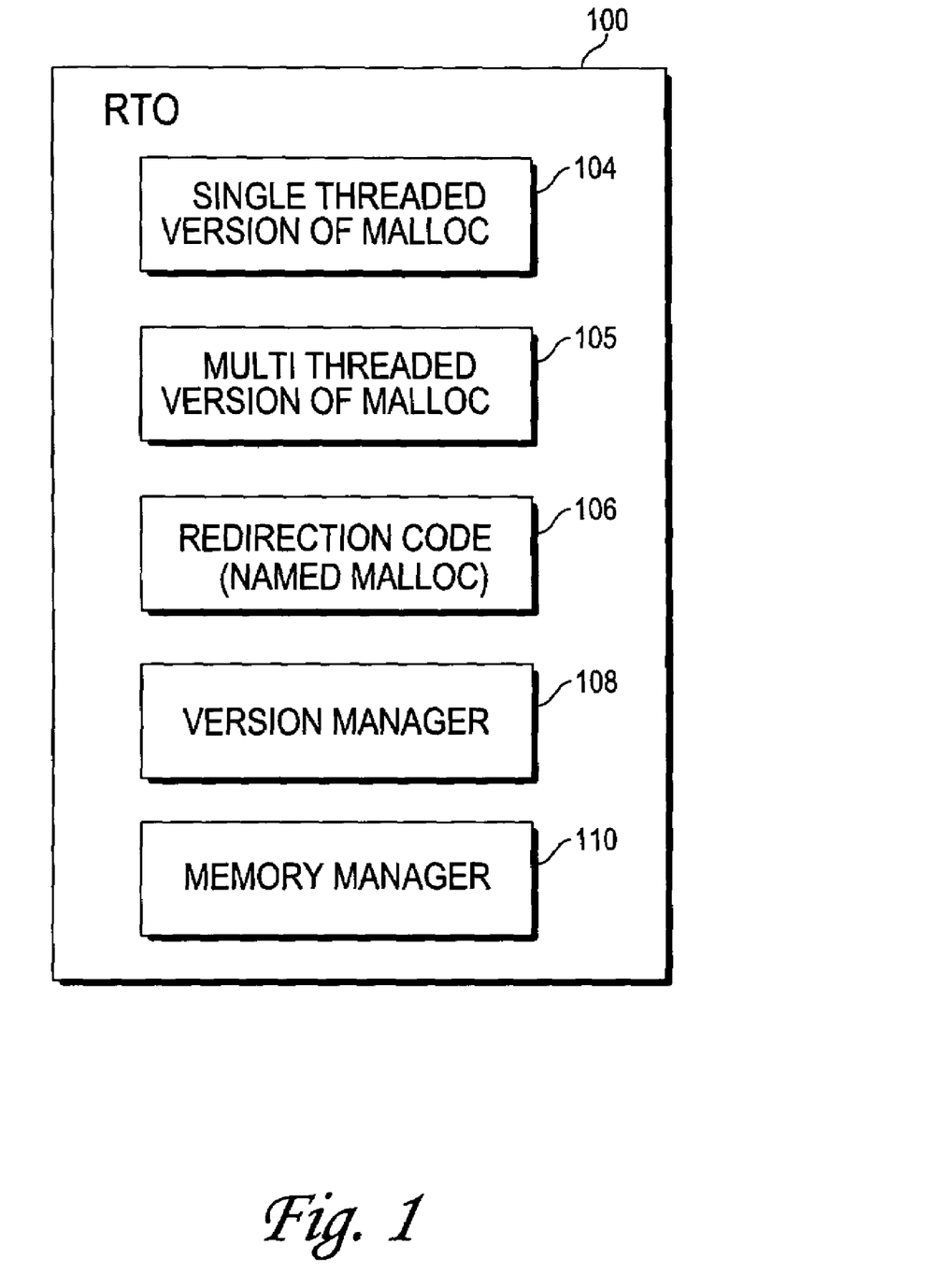
FIG. 1 shows a functional block diagram of a runtime optimizer, in accordance with one embodiment of the present invention.

With reference to FIG. 1, there is shown a functional block diagram of an RTO 100, in accordance with one embodiment of the present invention. In the following discussion, reference will be made to "malloc" as an example of a function. It should be noted though that this is done for illustrative purposes only. The present invention is not limited to the malloc function but rather may be applied generally to any function that may benefit from the methodology described herein. As used herein, the term function refers broadly to any utility, service, capability, functionality, etc. that can be invoked by a program. A function may take on any desired form, including but not limited to a method, a subroutine, a class, etc.

As shown in FIG. 1, RTO 100 comprises a single threaded version of malloc 104 and a multi threaded version of malloc 105. In one embodiment, the multi threaded version of malloc 105 is a replica of a standard multi threaded version of malloc that is provided by an operating system. Both versions of malloc 104, 105 perform all of the memory allocation tasks that are performed by the standard version of malloc; however, version 104 does not include any code for ensuring multi thread safety. More specifically, version 104 does not include any locking code for implementing locking functionality. Because it does not include any locking code, version 104 will execute much faster and more efficiently than the multi threaded version of malloc 105 that does have locking code. However, because it does not include any locking code, version 104 can be executed safely only when a program is executing in single threaded mode. As a result, the use of version 104 needs to be managed carefully.

RTO 100 further comprises a set of redirection code 106. In one embodiment, it is this redirection code 106 that determines which version of malloc is referenced by a program. In one embodiment, the redirection code 106 contains a branch instruction (note: the term branch instruction is used generically herein to refer to a type of instruction and not to an instruction having the name "branch"). The branch instruction has an op code and a target. The target points to the section of code to which execution is to branch. Thus, if the target points to version 104, then the single threaded version of malloc will be referenced and invoked by a program. If the target points to version 105, then the multi threaded version of malloc will be referenced and invoked by the program. In one embodiment, the set of redirection code 106 is given the same function name (in this example, malloc) as the name of the multi threaded version of the malloc function that is provided by the operating system. The significance of this will be elaborated upon in a later section.

RTO 100 further comprises a version manager 108. In one embodiment, it is the version manager 108 that determines and controls the version of malloc that is referenced by the redirection code 106. In one embodiment, the version manager 108 detects when a program transitions from executing in single threaded mode to multi threaded mode, and vice versa, and in response to such detection, the version manager 108 updates the redirection code 106 accordingly. More specifically, in one embodiment, when the program transitions from executing in single threaded mode to executing in multi threaded mode, the version manager 108 rewrites the branch instruction in the redirection code 106 to update the target so that it points to the multi threaded version of malloc 105 instead of version 104. Conversely, when the program transitions from executing in multi threaded mode to executing in single threaded mode, the version manager 108 rewrites the branch instruction in the redirection code 106 to update the target so that it points to version 104 instead of the multi threaded version 105. In this way, the version manager 108 controls, based upon the execution mode of the program, which version of malloc the program should be referencing at any particular time.

In one embodiment, the version manager 108 detects execution mode transitions by intercepting requests made by the program to create new threads of execution for executing the program (this enables the version manager 108 to detect a transition from single threaded mode to multi threaded mode). The version manager 108 may also request thread count information from the operating system to determine how many threads of execution are currently executing the program (this enables the version manager 108 to detect both a transition from single threaded mode to multi threaded mode and a transition from multi threaded mode to single threaded mode). These and other methods may be used to detect execution mode transitions.

RTO 100 further comprises a memory manager 110. This memory manager 110 performs the memory allocation tasks that are needed by RTO 100. Because RTO 100 has its own memory manager 110, it does not need to invoke either the single threaded version of malloc 104 or the multi threaded version of malloc 105. The significance of this will be elaborated upon in a later section.

For the sake of simplicity, RTO 100 is shown in FIG. 1 as having a single threaded version 104 and a multi threaded version 105 for only the malloc function. If so desired, RTO 100 may contain single threaded versions and multi threaded versions for one or more other functions as well. For example, RTO 100 may further contain a single threaded version and a multi threaded version for functions X, Y, and Z. If RTO 100 has such versions for such functions, then it will be able to optimize the execution of those functions (X, Y, and Z) in the same manner as that described for the malloc function. If RTO 100 has single threaded versions and multi threaded versions for other functions, then it would also have additional sets of redirection code 106 (one for each function). This and other enhancements are within the scope of the present invention. Also, in addition to the components already described, RTO 100 may further comprise additional components for performing additional tasks.

Sample Operation

Figure 2A:
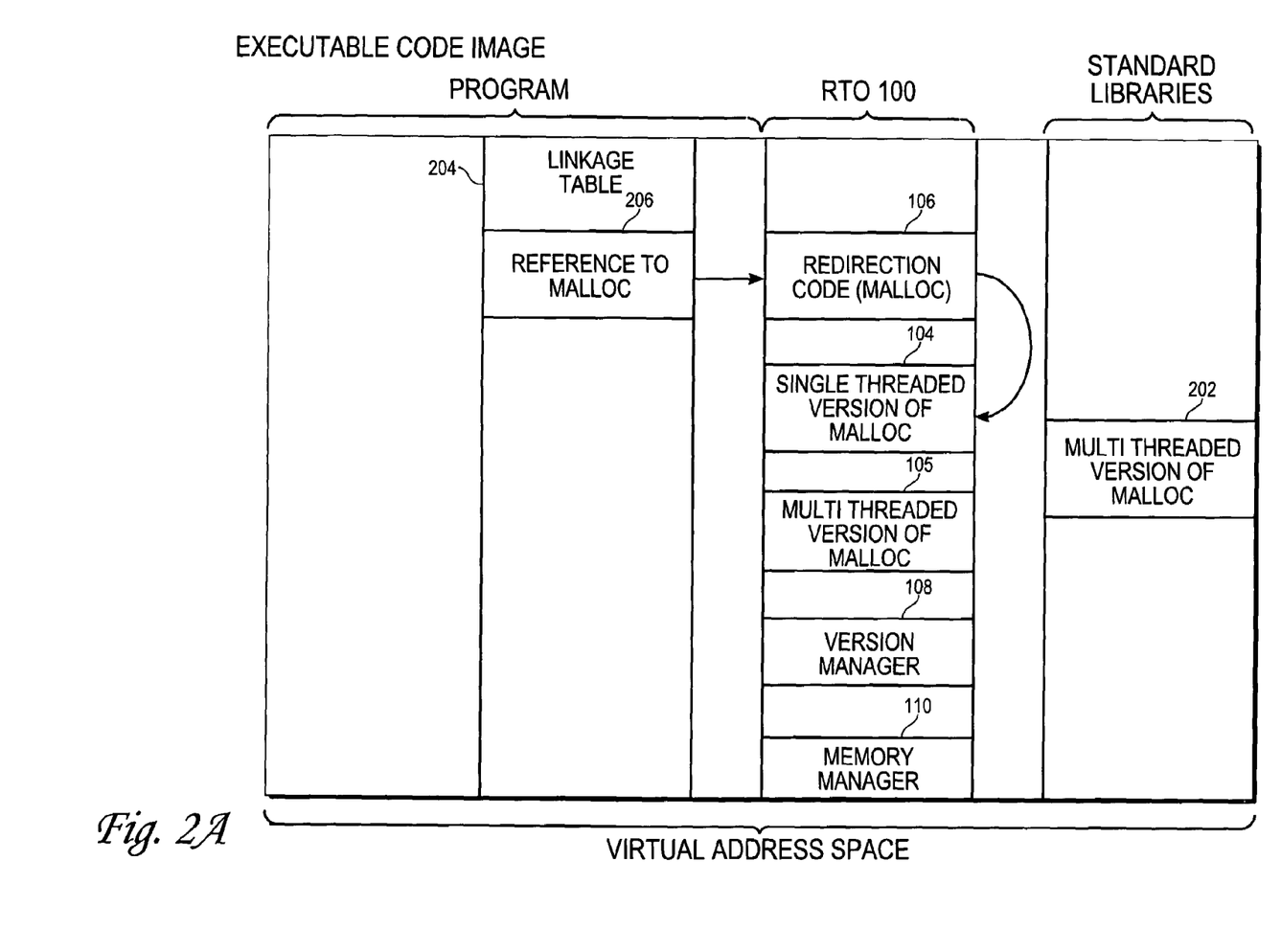
FIGS. 2a and 2b show a sample code image for a program.
Figure 2B:
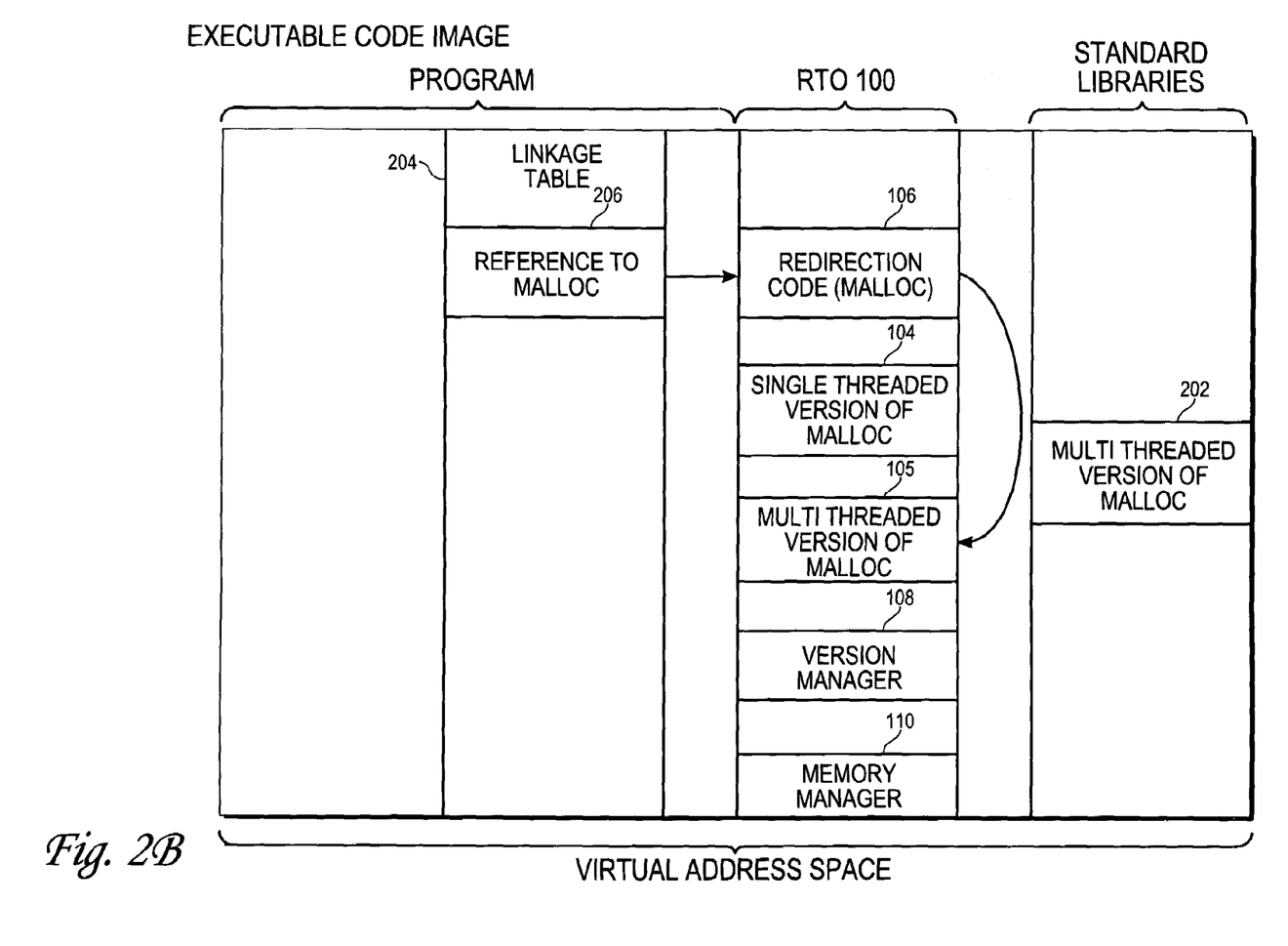
Figure 3:
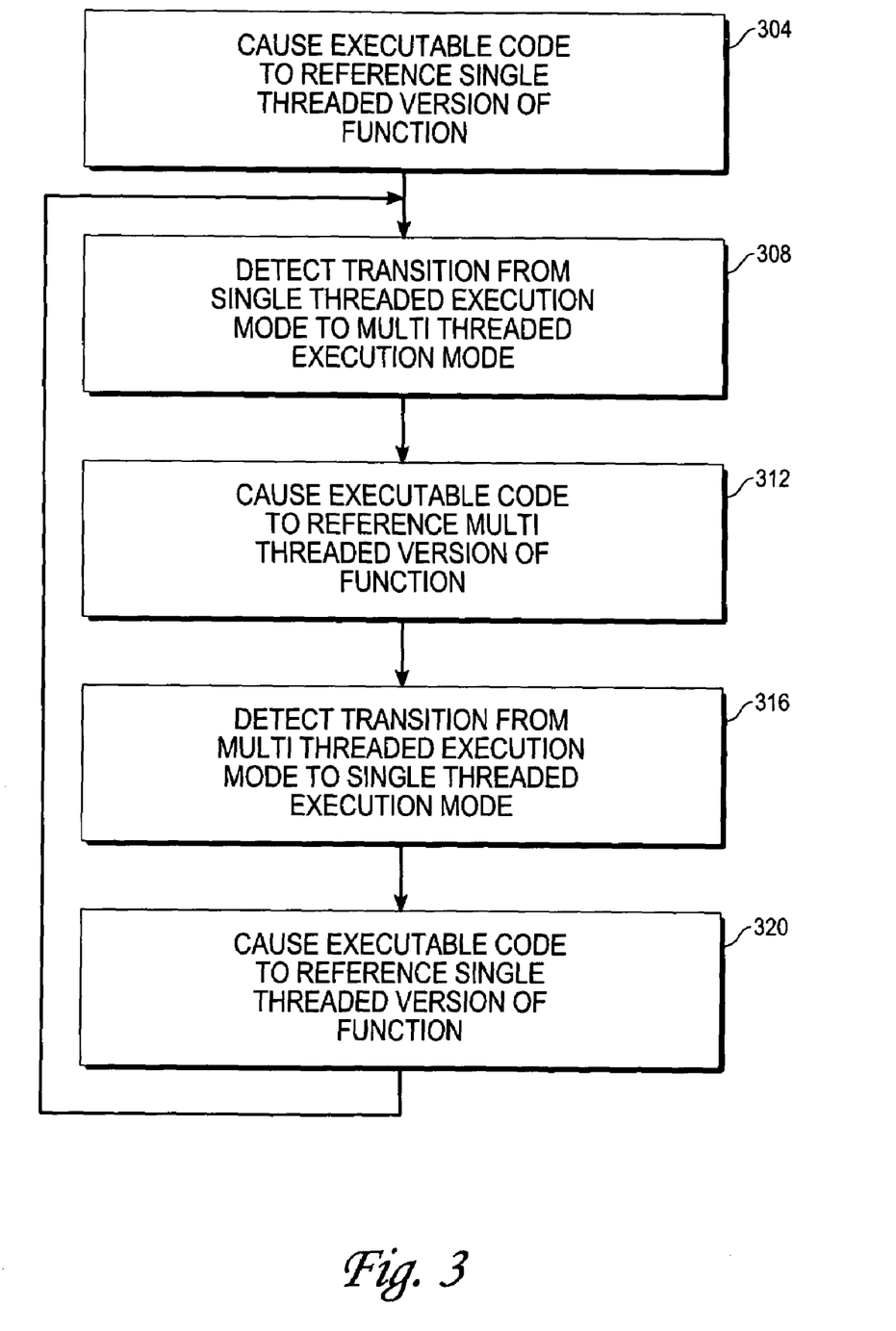
FIG. 3 is an operational flow diagram illustrating how one embodiment of the present invention operates.

With reference to FIGS. 2a, 2b, and 3, a sample operation will now be described. FIGS. 2a and 2b show the executable code image for a sample program, and FIG. 3 shows a sample operational flow diagram.

As noted previously, in one embodiment, the RTO 100 is implemented as a DLL. As with other DLL's, the RTO 100 is loaded and linked with a program when that program is loaded and executed; thus, the RTO 100 becomes a part of the executable code image of that program. In one embodiment, the RTO 100 is preloaded by the operating system, which means that the components of the RTO 100 are loaded and linked with the program before other libraries (such as the standard libraries provided by the operating system); thus, the RTO 100 takes precedence. FIG. 2 shows the executable code image of a sample program after the RTO 100 and the standard libraries provided by the operating system have been loaded and linked.

As shown, the executable code image has a portion that represents the actual code of the program. The executable code image also has a portion that represents the RTO 100 and the standard libraries that have been loaded and linked with the program. The portion that represents the actual program code includes a linkage table 204. This linkage table 204 contains links to functions that are invoked by the program code. In the current example, a portion 206 of the linkage table 204 references the malloc function. Normally, this portion 206 would reference the multi threaded version of malloc 202 provided by the standard libraries. However, because the redirection code 106 of the RTO 100 has the same name (malloc) as the multi threaded version of malloc 202, and because the RTO 100 is loaded before the standard libraries, the redirection code 106 takes precedence; thus, as shown in FIG. 2a, the portion 206 of the linkage table 204 that references malloc points to the redirection code 106 instead of the multi threaded version of malloc 202 provided by the standard libraries.

Initially, the branch instruction in the redirection code 106 is set such that its target points to the single threaded version of malloc 104. Because portion 206 of the linkage table 204 points to the redirection code 106, and because the redirection code 106 points to the single threaded version of malloc 104, the program is initially caused (block 304 of FIG. 3) to reference the single threaded version 104 of the malloc function. At this point, there is only one thread of execution that is executing the actual program code; thus, it is safe to reference the single threaded version 104 of the malloc function.

In one embodiment, after the RTO 100 is loaded, a separate thread is created to execute the RTO code. Thus, from a true thread count standpoint, there are actually two threads of execution that are executing the executable code: one thread executing the program code and another thread executing the RTO code. Despite this, the version manager 108 does not consider the program to be executing in multi threaded mode at this point. The reason is that none of the components of the RTO 100 invoke malloc. Instead, they invoke the RTO's own memory manager 110 to perform memory allocation functions. Because of this, there is still only one thread of execution of the program that can potentially invoke the malloc function. Accordingly, the version manager 108 considers the program to still be executing in single threaded mode, at least from the standpoint of managing the multiple versions of the malloc function. Thus, the version manager 108 allows the single threaded version 104 to be referenced by the program.

After the libraries are fully linked to the program, and after all initialization has been performed, the program is ready for regular operation. During regular operation, the version manager 108 detects a change (if such a change occurs) from executing in single threaded mode to executing in multi threaded mode. The version manager 108 may detect this change by intercepting requests from the program to create new threads of execution for executing the program executable code, and maintaining a thread count. If the thread count exceeds a threshold, then the version manager 108 can conclude that the program is now executing in multi threaded mode. Alternatively, the version manager 108 may request thread count information from the operating system indicating how many threads of execution are currently executing the program. Based upon the thread count information, the version manager 108 can determine whether the program is now executing in multi threaded mode (since there is a thread executing the RTO 100, the version manager 108 may subtract one from the thread count for purposes of making this determination).

If the version manager 108 detects (block 308 of FIG. 3) that the program has transitioned from executing in single threaded mode to executing in multi threaded mode, and hence, there are or will be multiple threads of execution that may potentially invoke the malloc function, then the version manager 108 will cause (block 312 of FIG. 3) the program to reference the multi threaded version 105 of the malloc function (provided by RTO 100) instead of the single threaded version 104. In one embodiment, the version manager 108 does this by dynamically rewriting the branch instruction in the redirection code 106 to update the target so that it points to version 105 instead of version 104. As shown in FIG. 2b, this results in the redirection code 106 pointing to the multi threaded version of malloc 105 provided by RTO 100. This in turn causes the program to reference and invoke version 105 in future malloc calls. This is as it should be since the program is now executing in multi threaded mode and hence needs the multi thread safety provided by version 105.

Thereafter, the version manager 108 detects a change (if such a change occurs) from executing in multi threaded mode to executing in single threaded mode. The version manager 108 may detect this change by requesting thread count information from the operating system indicating how many threads of execution are currently executing the program. Based upon the thread count information, the version manager 108 can determine whether the program is now executing in single threaded mode (since there is a thread executing the RTO 100, the version manager 108 may subtract one from the thread count for purposes of making this determination).

If the version manager 108 detects (block 316 of FIG. 3) that the program has transitioned from executing in multi threaded mode to executing in single threaded mode, then the version manager 108 will cause (block 320 of FIG. 3) the program to reference the single threaded version of malloc 104 instead of the multi threaded version 105. In one embodiment, the version manager 108 does this by dynamically rewriting the branch instruction in the redirection code 106 to update the target so that it points to version 104 instead of version 105. As shown in FIG. 2a, this results in the redirection code 106 pointing again to the single threaded version of malloc 104 provided by the RTO 100. This in turn causes the program to reference and invoke version 104 in future malloc calls. Since the program is once again executing in single threaded mode, it is safe to reference and invoke the single threaded version 104 again. Thereafter, the state of the version manager 108 loops back to block 308 (FIG. 3) to once again check for and detect any transition from executing in single threaded mode to executing in multi threaded mode.

By managing the different versions of the function (malloc in the above example) in the manner described, the RTO 100 causes the single threaded version to be referenced whenever possible and the multi threaded version to be referenced only when necessary. Doing so enables the function to execute more optimally.

Alternative Embodiment

Figure 4A:
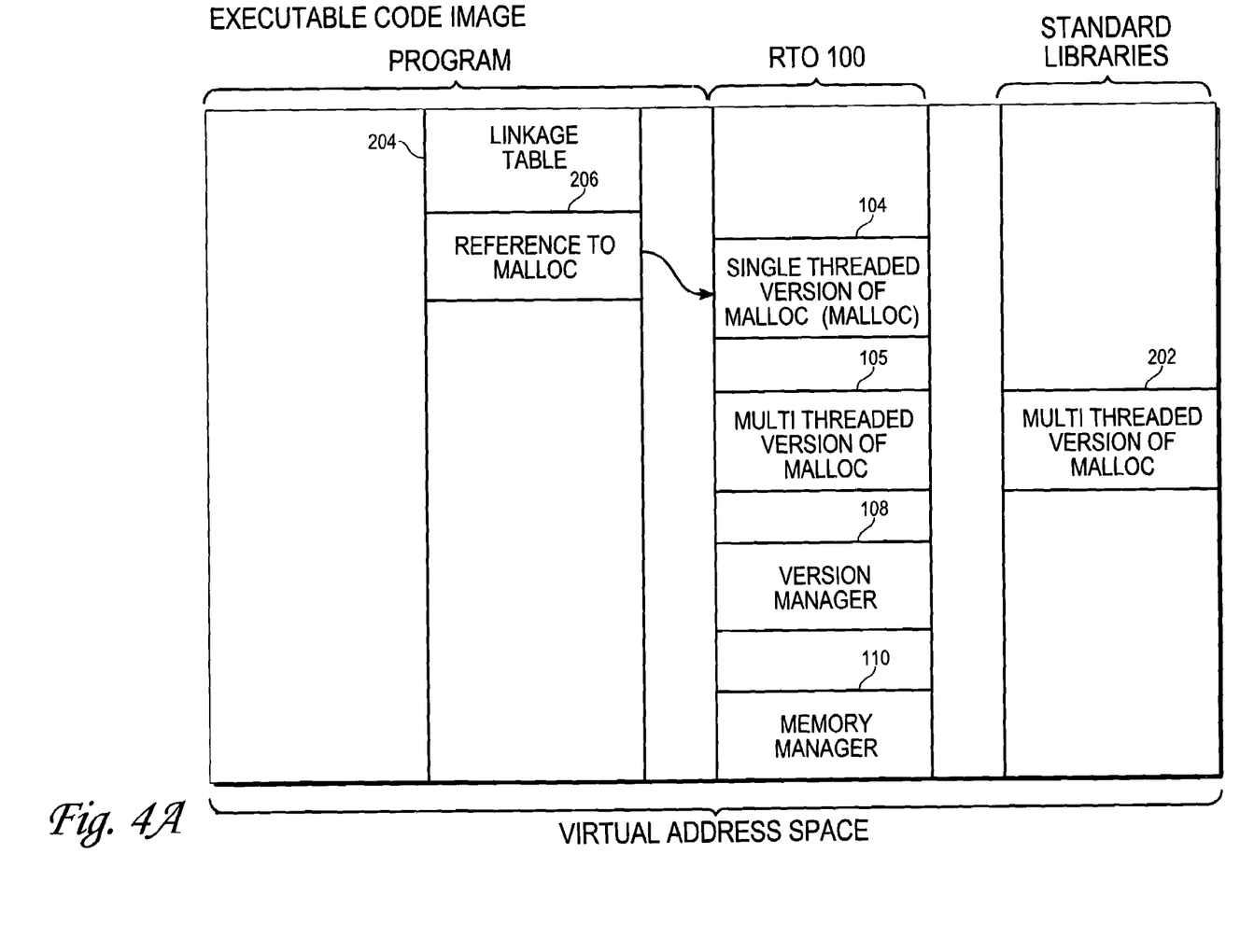
FIGS. 4a and 4b show another sample code image for a program.
Figure 4B:
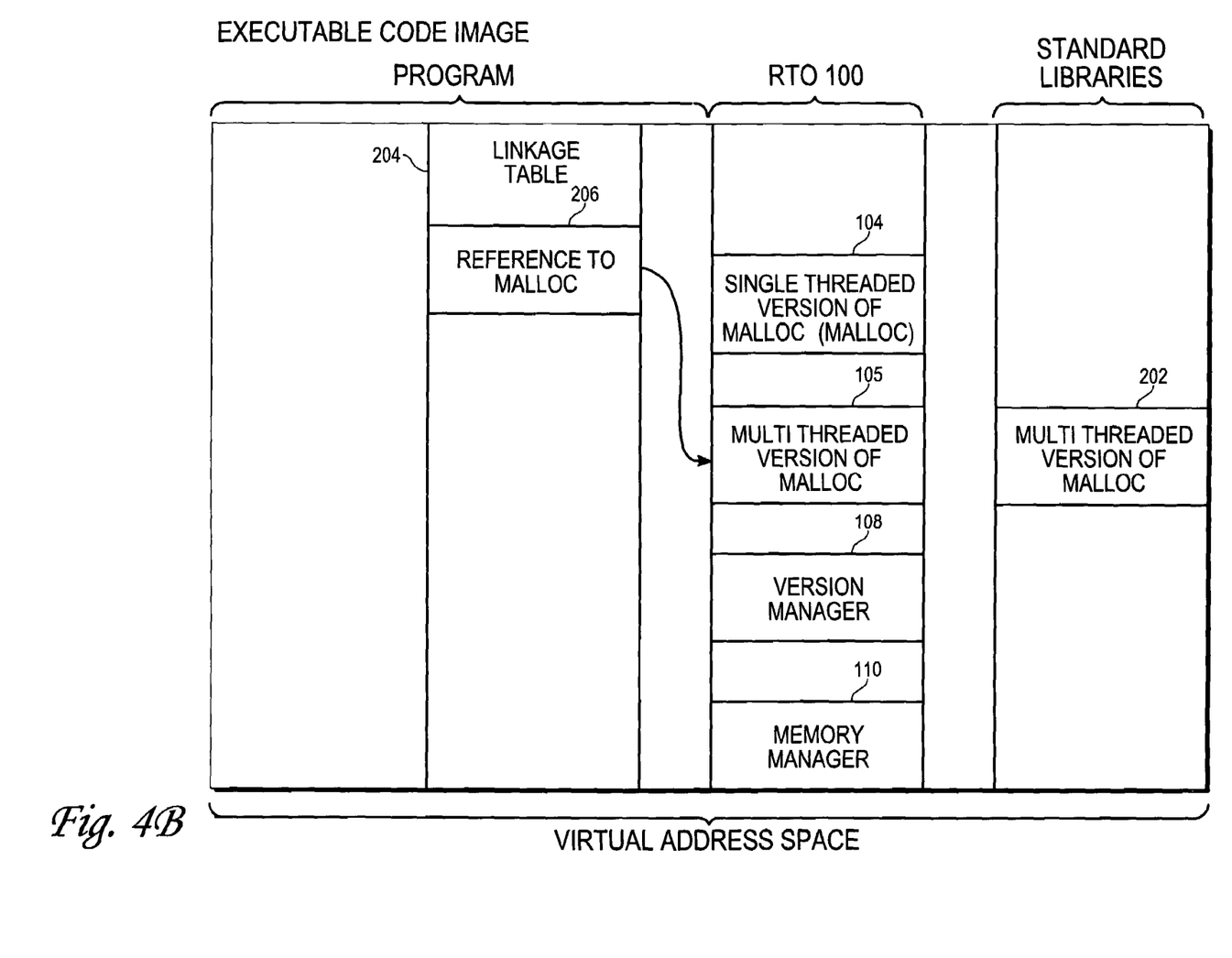

In the embodiment described above, the RTO 100 comprises a set of redirection code 106, and it is this redirection code 106 that points to one of the two versions 104, 105 of malloc. As an alternative, this redirection code 106 may be eliminated and the portion 206 of the linkage table 204 may be updated directly to point to one of the two versions of malloc. In such an embodiment, the single threaded version 104 of malloc would be given the same function name (in this example, malloc) as the name of the multi threaded version 202 of the malloc function that is provided by the operating system (recall that in the previous embodiment, the redirection code 106 was given this function name). FIGS. 4a and 4b show the sample code image for this embodiment after the RTO 100 and the standard libraries have been loaded and linked. This embodiment operates in much the same manner as the previously described embodiment except that, instead of updating the redirection code 106, the linkage table 204 is updated.

As shown in FIG. 4a, the linkage table 204 contains a portion 206 that references the malloc function. Normally, this portion 206 would reference the multi threaded version of malloc 202 provided by the standard libraries. However, because the single threaded version 104 of malloc provided by the RTO 100 has the same name (malloc) as the multi threaded version 202, and because the RTO 100 is loaded before the standard libraries, the single threaded version 104 takes precedence; thus, as shown in FIG. 4a, the portion 206 of the linkage table 204 that references malloc points to the single threaded version 104 instead of the multi threaded version 202 provided by the standard libraries.

If and when the version manager 108 detects a change from executing in single threaded mode to executing in multi threaded mode, the version manager 108 causes the program to reference the multi threaded version 105 of the malloc function provided by RTO 100 instead of the single threaded version 104. In this embodiment, the version manager 108 does this by dynamically rewriting portion 206 of the linkage table 204 to cause it to point to version 105 instead of version 104. The result is shown in FIG. 4b.

Conversely, if the version manager 108 detects a change from executing in multi threaded mode to executing in single threaded mode, the version manager 108 causes the program to reference the single threaded version 104 of the malloc function instead of the multi threaded version 105. In this embodiment, the version manager 108 does this by dynamically rewriting the same portion 206 of the linkage table 204 to cause it to point to version 104 instead of version 105. The result is shown in FIG. 4a.

This and other embodiments are within the scope of the present invention.

Hardware Overview

Figure 5:
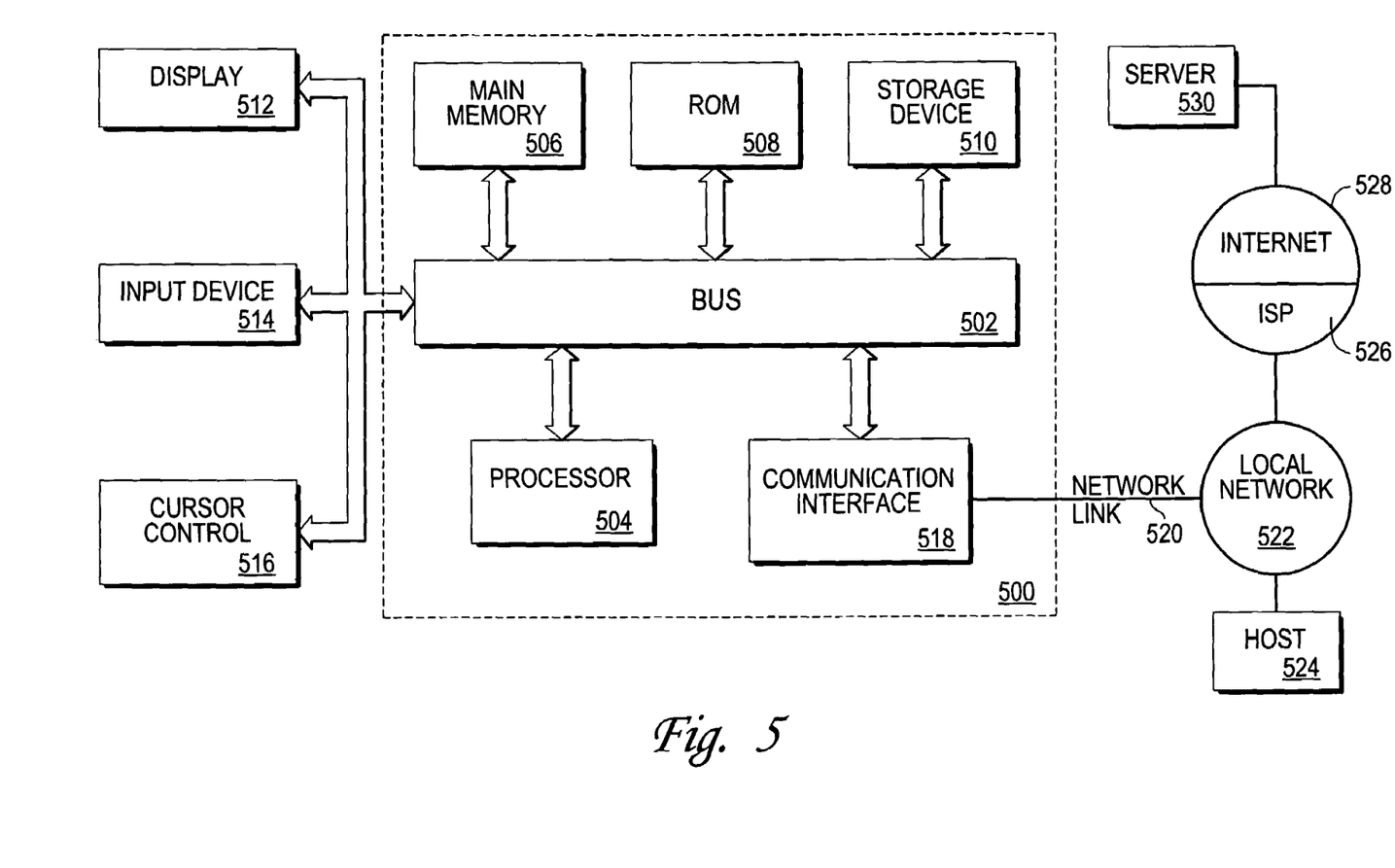
FIG. 5 is a block diagram of a general purpose computer system in which one embodiment of the present invention may be implemented.

In one embodiment, the components of the RTO 100 may take the form of sets of instructions that are executed by one or more processors. If they take the form of sets of instructions, FIG. 5 shows a block diagram of a computer system 500 upon which these sets of instructions may be executed. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may further be a network connection that connects one or more of the components. Any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:
   causing, by a run time optimizer (RTO) thread executing a RTO at run time, by causing a branch instruction to reference a first version of a function,
      wherein the RTO comprises redirection code having a same name as a standard library version of the function, wherein the redirection code comprises the branch instruction,
      wherein the RTO is loaded and linked with the program as a dynamically linked library such that a linkage table of the program references the redirection code based on the redirection code having the same name as the standard library version of the function,
      wherein the executable code currently has only one program thread of execution that invokes the function, and
      wherein the first version of the function is a single threaded version that does not ensure multi thread safety;
   intercepting, by the RTO thread at run time, a request from the program to create another program thread of execution for executing the executable code;
   detecting, in response to intercepting the request to create another program thread and based on a thread count of a number of program threads, that the executable code transitioned from only the one program thread to having multiple program threads of execution that invokes the function; and
   in response to detecting that the executable code has multiple threads of execution that invoke the function, rewriting, by the RTO thread, the branch instruction to reference a second version of the function instead of the first version of the function, wherein the second version of the function is a multi threaded version that does ensure multi thread safety.

2. The method of claim 1, wherein the function performs memory allocation, wherein the first version of the function does not implement locking functionality for ensuring data integrity and consistency, and wherein the second version of the function does implement locking functionality for ensuring data integrity and consistency.

3. The method of claim 1, further comprising:
   detecting that the executable code no longer has the multiple program threads of execution that invoke the function; and
   in response to detecting that the executable code no longer has the multiple program threads of execution that invoke the function, rewriting the branch instruction the executable code to reference the first version of the function instead of the second version of the function.

4. A non-transitory machine readable medium, comprising instructions for a run time optimizer (RTO) thread executing a RTO at run time, the RTO comprising:
   instructions for causing one or more processors to cause a branch instruction to reference a first version of a function,
      wherein the branch instruction is in redirection code comprised in the RTO, wherien the redirection code has a same name as a standard library version of the function, and wherein the RTO is loaded and linked with the program as a dynamically linked library such that a linkage table of the program references the redirection code based on the redirection code having the same name as the standard library version of the function, wherein the executable code currently has only one program thread of execution that invokes the function, and wherein the first version of the function is a single threaded version that does not ensure multi thread safety;

instructions for causing one or more processors to intercept a request from the program to create of another program thread of execution for executing the executable code;

instructions for causing one or more processors to detect, in response to intercepting the request to create another program thread and based on a thread count of a number of program threads, that the executable code transitioned from only the one program thread to having multiple program threads of execution that invoke the function; and instructions for causing one or more processors to rewrite, in response to detecting that the executable code has multiple threads of execution that invoke the function, the branch instruction to reference a second version of the function instead of the first version of the function, wherein the second version of the function is a multi threaded version that does ensure multi thread safety.

5. The machine readable medium of claim 4, wherein the function performs memory allocation, wherein the first version of the function does not implement locking functionality for ensuring data integrity and consistency, and wherein the second version of the function does implement locking functionality for ensuring data integrity and consistency.

6. The machine readable medium of claim 4, further comprising:

instructions for causing one or more processors to detect that the executable code no longer has the multiple program threads of execution that invoke the function; and instructions for causing one or more processors to rewrite, in response to detecting that the executable code no longer has the multiple program threads of execution that invoke the function, the branch instruction to reference the first version of the function instead of the second version of the function.

* * * * *